US012678789B2

(12) United States Patent
Sato et al.

(10) Patent No.: US 12,678,789 B2
(45) Date of Patent: Jul. 14, 2026

(54) FLOW CHANNEL DEVICE

(71) Applicant: KYOCERA Corporation, Kyoto (JP)

(72) Inventors: Masaki Sato, Yokohama (JP); Masaru Nagata, Kirishima (JP); Tomoyuki Ono, Kyotanabe (JP); Yuuki Nakayama, Kirishima (JP)

(73) Assignee: KYOCERA Corporation, Kyoto (JP)

( * ) Notice: Subject to any disclaimer, the term of this patent is extended or adjusted under 35 U.S.C. 154(b) by 673 days.

(21) Appl. No.: 18/018,502

(22) PCT Filed: Jul. 27, 2021

(86) PCT No.: PCT/JP2021/027699
§ 371 (c)(1),
(2) Date: Jan. 27, 2023

(87) PCT Pub. No.: WO2022/025044
PCT Pub. Date: Feb. 3, 2022

(65) Prior Publication Data

US 2023/0294094 A1 Sep. 21, 2023

(30) Foreign Application Priority Data

Jul. 29, 2020 (JP) ................................ 2020-128431

(51) Int. Cl.
*B81B 1/00* (2006.01)
*B01L 3/00* (2006.01)

(52) U.S. Cl.
CPC . *B01L 3/502746* (2013.01); *B01L 2200/0684* (2013.01); *B01L 2200/16* (2013.01);
(Continued)

(58) Field of Classification Search
None
See application file for complete search history.

(56) References Cited

U.S. PATENT DOCUMENTS 6,001,307 A 12/1999 Naka et al.
6,063,589 A * 5/2000 Kellogg ................ H01R 39/64 422/50

(Continued)

FOREIGN PATENT DOCUMENTS

EP 1240945 A2 9/2002
JP 2002-512783 A 5/2002

(Continued)

OTHER PUBLICATIONS

Tabata et al., "Antibody-free digital influenza virus counting based on neuraminidase activity", Scientific Reports, Jan. 2019, www.nature.com/scientificreports, https://doi.org/10.1038/s41598-018-37994-6, 13 pages.

(Continued)

*Primary Examiner* — Paul S Hyun
(74) *Attorney, Agent, or Firm* — Procopio, Cory, Hargreaves & Savitch LLP

(57) ABSTRACT

A flow channel device includes a first storage part that stores liquid, a first flow channel through which liquid in the first storage part passes, and a second flow channel through which liquid passes to the first storage part, in which a thickness of the first flow channel is smaller than a thickness of the second flow channel.

13 Claims, 11 Drawing Sheets

(52) U.S. Cl.
CPC . *B01L 2300/0654* (2013.01); *B01L 2300/087* (2013.01); *B01L 2400/0622* (2013.01)

(56) References Cited

U.S. PATENT DOCUMENTS

| | | | | |
|---|---|---|---|---|
| 6,632,656 | B1 | 10/2003 | Thomas et al. | |
| 2002/0036018 | A1 | 3/2002 | McNeely et al. | |
| 2002/0151078 | A1* | 10/2002 | Kellogg | B01L 3/5027 436/180 |
| 2004/0058408 | A1 | 3/2004 | Thomas et al. | |
| 2004/0203136 | A1 | 10/2004 | Kellogg et al. | |
| 2014/0186963 | A1 | 7/2014 | Hsiue et al. | |
| 2017/0095811 | A1 | 4/2017 | Boehm et al. | |
| 2017/0145363 | A1* | 5/2017 | Hsu | C12M 33/04 |
| 2019/0194717 | A1 | 6/2019 | Noji et al. | |

FOREIGN PATENT DOCUMENTS

| | | | |
|---|---|---|---|
| JP | 2002-527250 | A | 8/2002 |
| JP | 2009-125635 | A | 6/2009 |
| JP | 2018-038384 | A | 3/2018 |
| WO | 2018/043733 | A1 | 3/2018 |

OTHER PUBLICATIONS

Minagawa et al., "Mobile imaging platform for digital influenza virus counting", Lab on a Chip, RoyalSociety of Chemistry, 2019, pp. 2678-2687.

* cited by examiner

FLOW CHANNEL DEVICE

TECHNICAL FIELD

The present disclosure relates to a flow channel device.

BACKGROUND OF INVENTION

Patent Document 1 discloses a technology that can be used to detect virus particles such as influenza virus particles.

CITATION LIST

Patent Literature

Patent Document 1: JP 2018-038384 A

SUMMARY

In an aspect of the present disclosure, a flow channel device includes a first storage part that stores liquid, a first flow channel through which the liquid in the first storage part passes, and a second flow channel through which liquid passes to the first storage part, in which a thickness of the first flow channel is smaller than a thickness of the second flow channel.

DESCRIPTION OF EMBODIMENTS

Outline of Virus Detection Using Flow Channel Device

A flow channel device 1 of the present disclosure is used to detect a virus contained in a specimen (sample) collected from a user and perform quantitative analysis of the virus. Once the specimen is introduced into the flow channel device 1, the specimen is mixed with a reagent in the flow channel device 1, and the mixture solution is temporarily stored in a first storage part 43 (see FIG. 1 which will be described later).

The specimen may be, for example, a substance of biological origin. Examples of the specimen include urine, blood, sweat, saliva, and nasal discharge. The reagent is a substance including a substrate that reacts with the virus contained in the specimen. For example, the substrate reacts with an enzyme possessed by the virus. A reaction product results from the reaction of the enzyme with the substrate. For example, when detecting the influenza virus, a reagent containing 4-methylumbelliferyl-α-D-neuraminic acid is used as a substrate that reacts with neuraminidase, an enzyme of the influenza virus. The reaction of the neuraminidase with 4-methylumbelliferyl-α-D-neuraminic acid yields 4-methylumbelliferone as a reaction product.

The reaction product emits fluorescence having a specific peak wavelength, for example, in response to irradiation with light having a predetermined peak wavelength. This allows detection of the virus if it is contained in the specimen. The virus detection is performed by a detection device (not illustrated) including a light emitter that emits light to the first storage part 43 and a light receiver that receives fluorescence emitted from the first storage part 43.

In the following, a specific interior structure of the flow channel device of the present disclosure is described. Before describing the specific interior structure, the specimen preparation flow is described.

Specimen Preparation Flow

Figure 2:
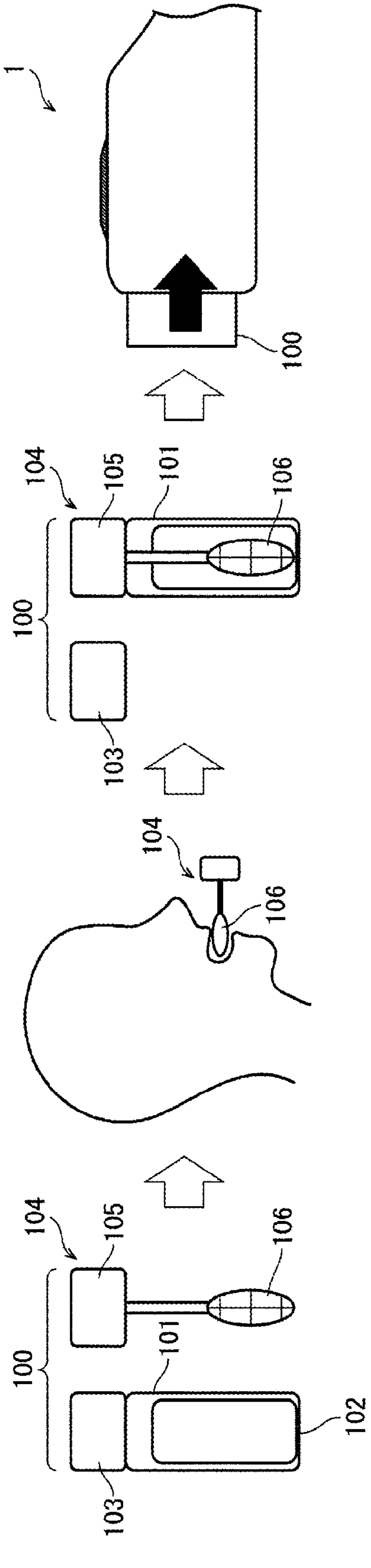
FIG. 2 schematically illustrates an example of a specimen preparation flow.

FIG. 2 illustrates an example of a specimen preparation flow. As illustrated in FIG. 2, a specimen container 100 for storing a specimen collected from a user is prepared. The specimen container 100 includes a container body 101, and the container body 101 may include a buffer solution in which the specimen is diffused.

A bottom portion 102 of the container body 101 may be made of a material that breaks under physical pressure. When the specimen container 100 is inserted into an insertion portion 24 (see FIG. 4) of the flow channel device 1 so that the bottom portion 102 faces the flow channel device 1, a channel protruding portion 49 (see FIG. 4) of the flow channel device 1 punctures the bottom portion 102. This allows the container body 101 to be connected to a microchannel substrate 4 (see FIG. 4) of the flow channel device 1.

The container body 101 can be fitted with a lid 103 or a sampler 104. Before the specimen is collected, the specimen container 100 has a lid 103 mounted on the container body 101. The sampler 104 includes a specimen collection portion 106 at the tip of a lid part 105.

To collect saliva as the specimen, for example, the user inserts the specimen collection portion 106 into the mouth of the user to deposit saliva on the specimen collection portion 106. After saliva is deposited on the specimen collection portion 106, the sampler 104 is attached to the container body 101 instead of the lid 103.

The lid 103 and the lid part 105 together with the tip of the container body 101 may have a threaded structure. In the threaded structure, by rotating the specimen collection portion 106 along the rotation axis in an insertion direction of the sampler 104, the lid part 105 can be screwed onto the container body 101, thus attaching the sampler 104 to the container body 101. This causes the buffer solution to be stirred, letting saliva (or viruses contained in saliva) be deposited in the specimen collection portion 106 and mixed with the buffer solution substantially uniformly.

The specimen collection portion 106 may be, for example, a pleated resin member. When the specimen collection portion 106 is pleated, viruses in saliva can be mixed efficiently with the buffer solution compared with the case in which the specimen collection portion 106 is made of a cotton member such as a cotton swab. The pleated member can decrease the adsorption of viruses contained in saliva to the specimen collection portion 106 compared with the case in which the specimen collection portion 106 is made of a cotton member. Furthermore, when the specimen collection portion 106 is immersed in the buffer solution, the residual saliva in the specimen collection portion 106 can be reduced and the discharge efficiency of saliva in the buffer solution due to capillary action can be improved. The specimen collection portion 106 may have a spatular structure to improve stirring efficiency. In the following description, the mixture solution of the specimen and buffer solution is referred to as a specimen solution.

First Embodiment

Overall Structure of Flow Channel Device

Figure 3:
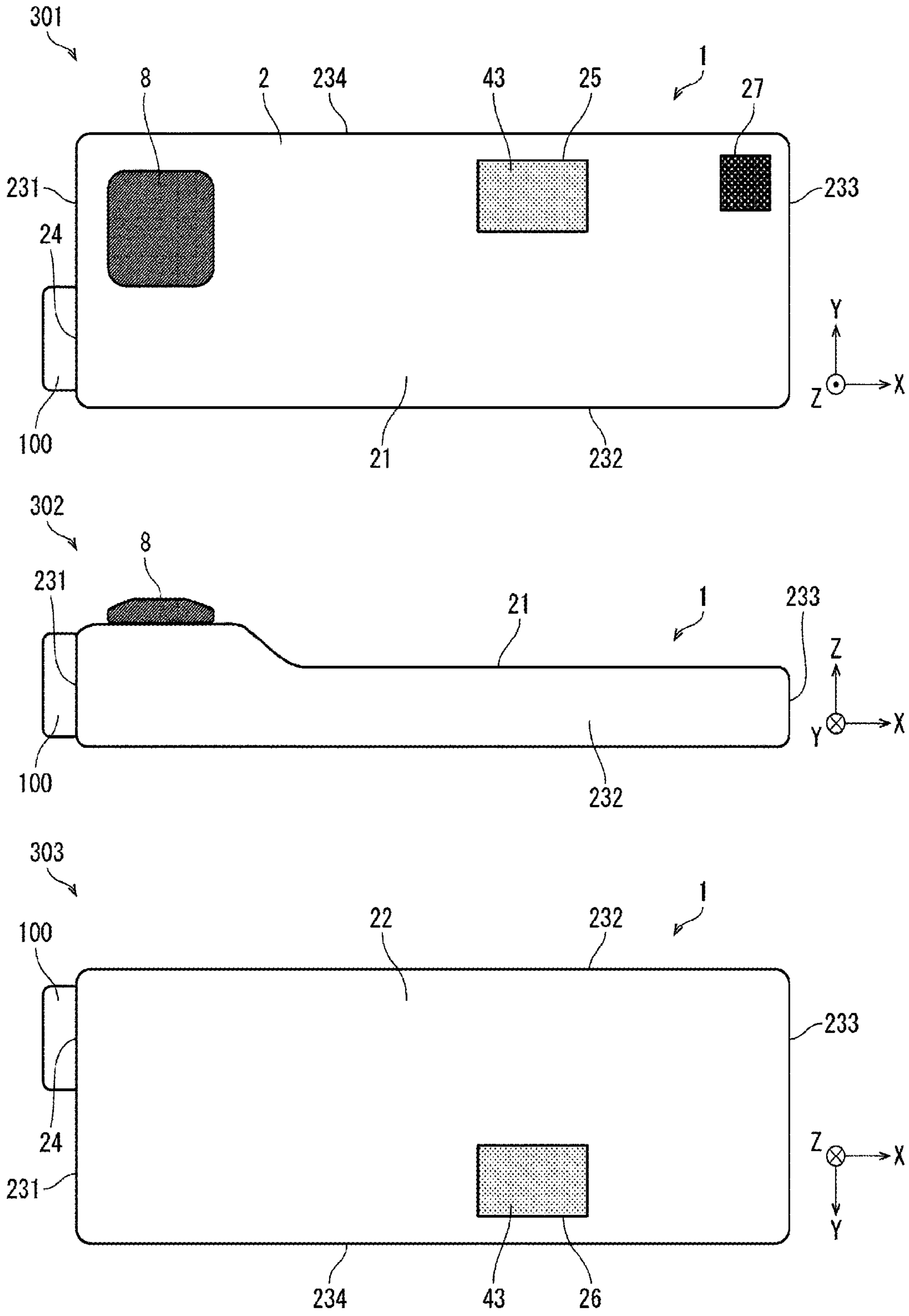
FIG. 3 includes plan views and a side view illustrating an example of the exterior of the flow channel device according to the first embodiment.

Details of the flow channel device 1 according to one aspect of the present disclosure will be described. FIG. 3 illustrates plan views and a side view illustrating an example of the exterior of the flow channel device 1. A reference sign 301 in FIG. 3 indicates a plan view when the flow channel device 1 is viewed from a surface 21 side (a plan view when viewed from the +Z direction to −Z direction). A reference sign 302 in FIG. 3 indicates a side view when the flow channel device 1 is viewed from a second side surface 232 side (a side view when viewed from the −Y direction to +Y direction). A reference sign 303 is a plan view when the flow channel device 1 is viewed from a back surface 22 side (a plan view when viewed from the −Z direction to +Z direction).

As illustrated in FIG. 3, the flow channel device 1 is covered with a housing 2. The housing 2 includes the surface 21, the back surface 22 which is a surface opposite to the surface 21, and first to fourth side surfaces 231, 232, 233, and 234 which are all standing on the surface 21 and the back surface 22.

As indicated by reference signs 301 and 302, a pressure switch 8 may be provided on the surface 21 side. The pressure switch 8 will be described later. The surface 21 may also include an identification code 27 for identifying the flow channel device 1.

As indicated by reference signs 301 and 303, the surface 21 may include a first window portion 25, and the back surface 22 may include a second window portion 26. When the flow channel device 1 is inserted into the detection device, the first storage part 43 is disposed between a light emitter and a light receiver of the detection device. At this time, the first storage part 43 may be disposed, for example, on a line virtually connecting the light emitter and the light receiver of the detection device, or on a line optically connecting the light emitter and the light receiver of the detection device. The first window portion 25 is formed to face the first storage part 43, and enables the light emitted from the light emitter to pass through and guides the light to the first storage part 43. The second window portion 26 is formed to face the first storage part 43, and enables the fluorescence emitted from the first storage part 43 to pass through and guides it to the light receiver.

As indicated by reference signs 301 and 303, the insertion portion 24 that allows insertion of the specimen container 100 into the flow channel device 1 may be provided on the first side surface 231. When introducing the specimen solution into the flow channel device 1, the flow channel device 1 is used with the specimen container 100 inserted into the insertion portion 24 and the first side surface 231 facing vertically upward (−X direction).

Figure 4:
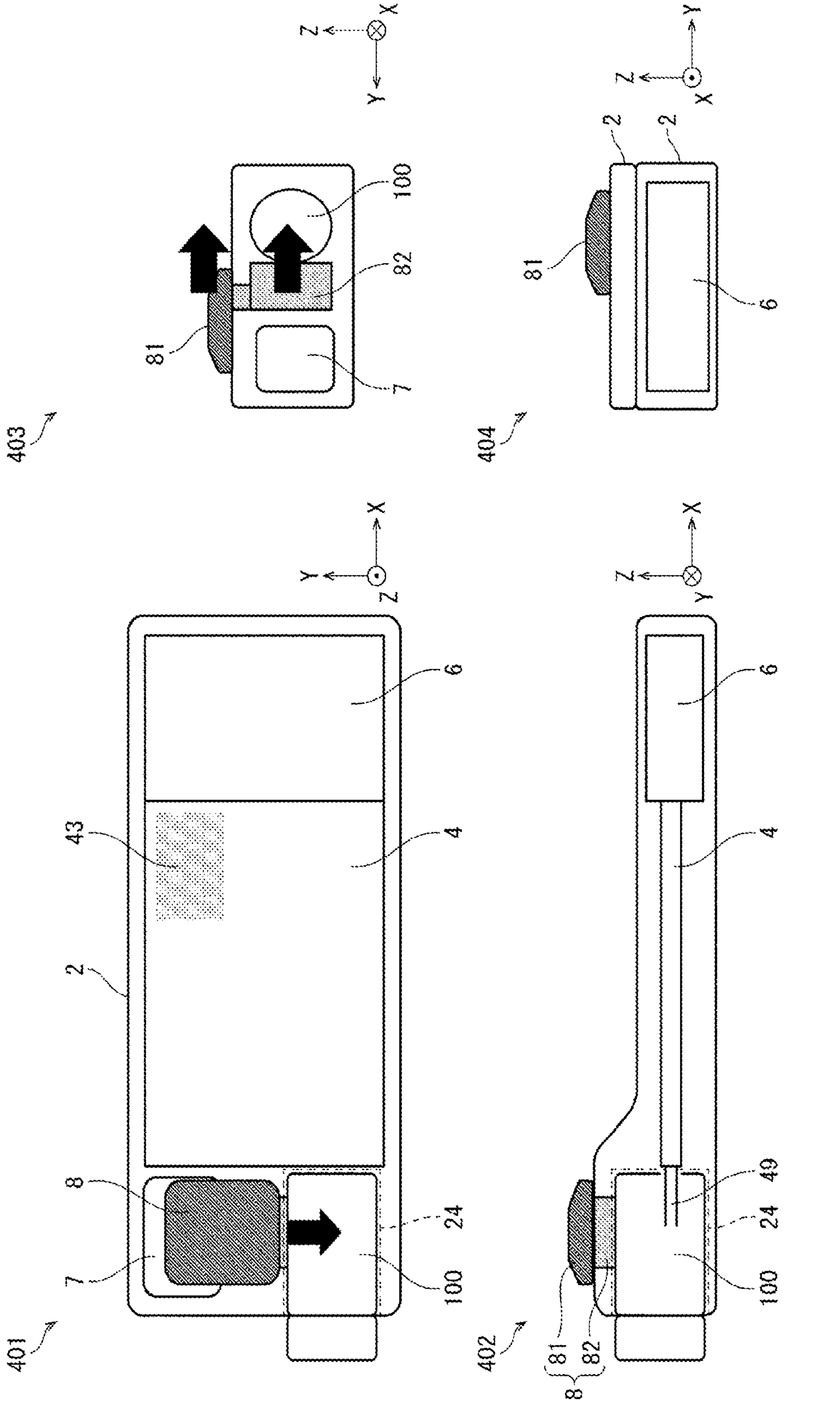
FIG. 4 includes a plan view and side views schematically illustrating an example of the interior structure of the flow channel device according to the first embodiment.

FIG. 4 illustrates a plan view and side views schematically illustrating an example of the interior structure of the flow channel device 1. In FIG. 4, reference sign 401 indicates a plan view corresponding to the reference sign 301 with the surface 21 removed. Reference sign 402 indicates a side view corresponding to reference sign 302 with the second side surface 232 removed. Reference sign 403 indicates a side view when viewed from the first side surface 231 (a side view when viewed from the −X direction toward the +X direction) with the first side surface 231 removed. A reference sign 404 indicates a side view when viewed from the third side surface 233 (a side view when viewed from the +X direction toward the −X direction) with the third side surface 233 removed.

As indicated by the reference signs 401 and 402, the flow channel device 1 may include the microchannel substrate 4, a third lower storage part 6, a fourth storage part 7, and the pressure switch 8 inside the housing 2. The third lower storage part 6 may function as a third storage part, along with a third upper storage part 45 (see FIG. 1), which will be described later, for storing unnecessary liquid. That is, in the present embodiment, the third storage part may include the third lower storage part 6 and the third upper storage part 45.

The microchannel substrate 4 may be a channel substrate into which the specimen solution is introduced from the specimen container 100 inserted into the insertion portion 24. The microchannel substrate 4 may include the first storage part 43 and the channel protruding portion 49.

The first storage part 43 may temporarily store a mixture solution (liquid) of the specimen solution and the reagent. This allows the detection device to irradiate the mixture solution stored in the first storage part 43 with light, and receive fluorescence emitted from the reaction product contained in the mixture solution.

Figure 5:
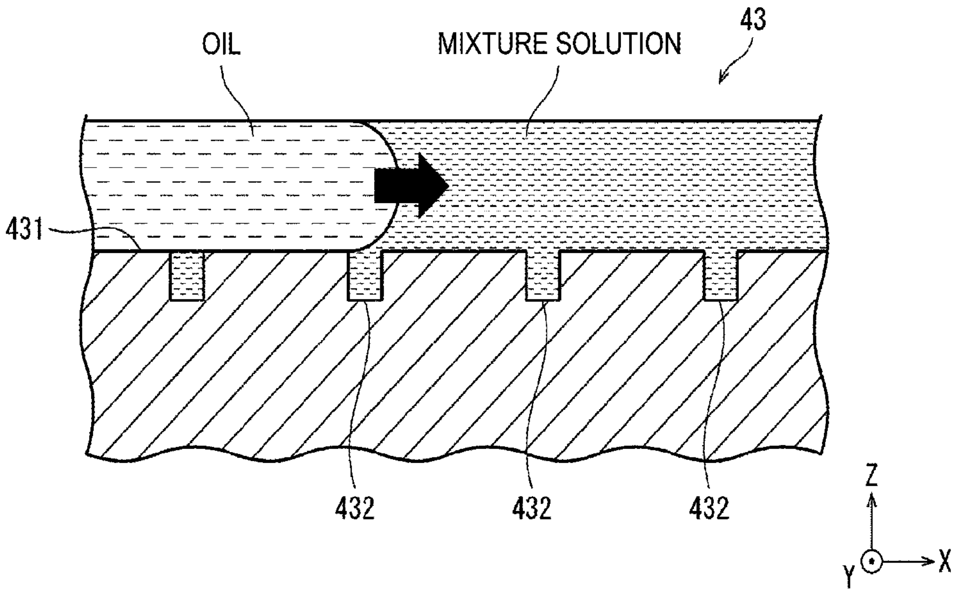
FIG. 5 is a side view schematically illustrating a portion of a first storage part.

FIG. 5 is a side view schematically illustrating a portion of the first storage part 43. As illustrated in FIG. 5, the first storage part 43 may have a plurality of internal fine recessed portions 432. The plurality of the fine recessed portions 432 is arranged over the entire bottom surface 431 of the first storage part 43 two-dimensionally. That is, the first storage part 43 may function as a micro-chamber array. The size of each recessed portion 432 may be defined as large enough to introduce a single virus particle. The first storage part 43 may be flattened, with the area when viewed in plan view being larger than the area when viewed from the side. This increases the efficiency of filling each recessed portion 432 with the mixture solution even when the amount of the specimen solution is small.

The channel protruding portion 49 protrudes from the microchannel substrate 4 toward the insertion portion 24 and may puncture the bottom portion 102 of the specimen container 100 inserted into the insertion portion 24. Details of the microchannel substrate 4 will be described later.

The third lower storage part 6 is connected to the first storage part 43, and may store the mixture solution that is no longer needed in the first storage part 43. The third lower storage part 6 may be a portion on the vertically lower side of the third storage part when the flow channel device 1 is in use. The third lower storage part 6 is disposed on the vertically lower side of the microchannel substrate 4 when the flow channel device 1 is in use. This reduces the likelihood of the mixture solution stored in the third lower storage part 6 flowing back to the first storage part 43.

The fourth storage part 7 may be connected to the first storage part 43 and may store oil (liquid) for introducing the mixture solution into each recessed portion 432. A connecting portion between the fourth storage part 7 and the first storage part 43 may be made of a material that breaks under physical pressure. The fourth storage part 7 is disposed on the vertically upper side of the microchannel substrate 4 when the flow channel device 1 is in use. This reduces the likelihood of mixing air bubbles in the microchannel substrate 4 even when air is contained inside the fourth storage part 7. The oil may be any liquid which is less likely to mix with a specimen and an aqueous solution such as a specimen solution. The oil may be, for example, an organic solvent, and may be an aprotic solvent. Examples of the aprotic solvent include, for example, a hydrocarbon solvent and a fluorinated solvent, and a perfluorocarbon solvent can be used as an example.

As illustrated in FIG. 5, after the mixture solution has been inserted into the first storage part 43, the connecting portion between the fourth storage part 7 and the first storage part 43 is broken by pressure to let the oil be introduced into the first storage part 43, thus pushing the mixture solution into each recessed portion 432. The remaining mixture solution not introduced into each recessed portion 432 arranged on the bottom surface 431 can be washed away to the third lower storage part 6. The detection device can detect the number of viral particles based on the presence or absence of light emitted from the recessed portions 432. Therefore, if the mixture solution exists in regions other than the recessed portions 432, it may not be possible to accurately detect the number of such particles. The introduction of oil into the first storage part 43 can reduce the occurrence of such a possibility.

The pressure switch 8 may pressurize the specimen container 100 inserted into the insertion portion 24. The pressure switch 8 may include an operator 81 operated by the user, and a pressurizer 82 that applies pressure to the specimen container 100. The operator 81 is connected to the pressurizer 82, and the pressurizer 82 may move as the operator 81 moves.

In the present embodiment, the pressurizer 82 is disposed adjacent to the insertion portion 24 and is capable of pressurizing a side portion of the specimen container 100 (specifically, the container body 101). When the operator 81 is moved toward the insertion portion 24 (in the −Y direction; the arrow direction indicated by reference signs 401 and 403), the pressurizer 82 also moves in the same direction. As a result, the pressurizer 82 pressurizes a side portion of the specimen container 100. This allows adjustment of the amount of specimen solution introduced into the microchannel substrate 4

The amount of pressurization of the pressurizer 82 (the amount of movement of the pressurizer 82) is adjusted to the extent of allowing the mixture solution to be distributed throughout the interior of the first storage part 43 in a single virus detection.

Structure of Microchannel Substrate

Figure 1:
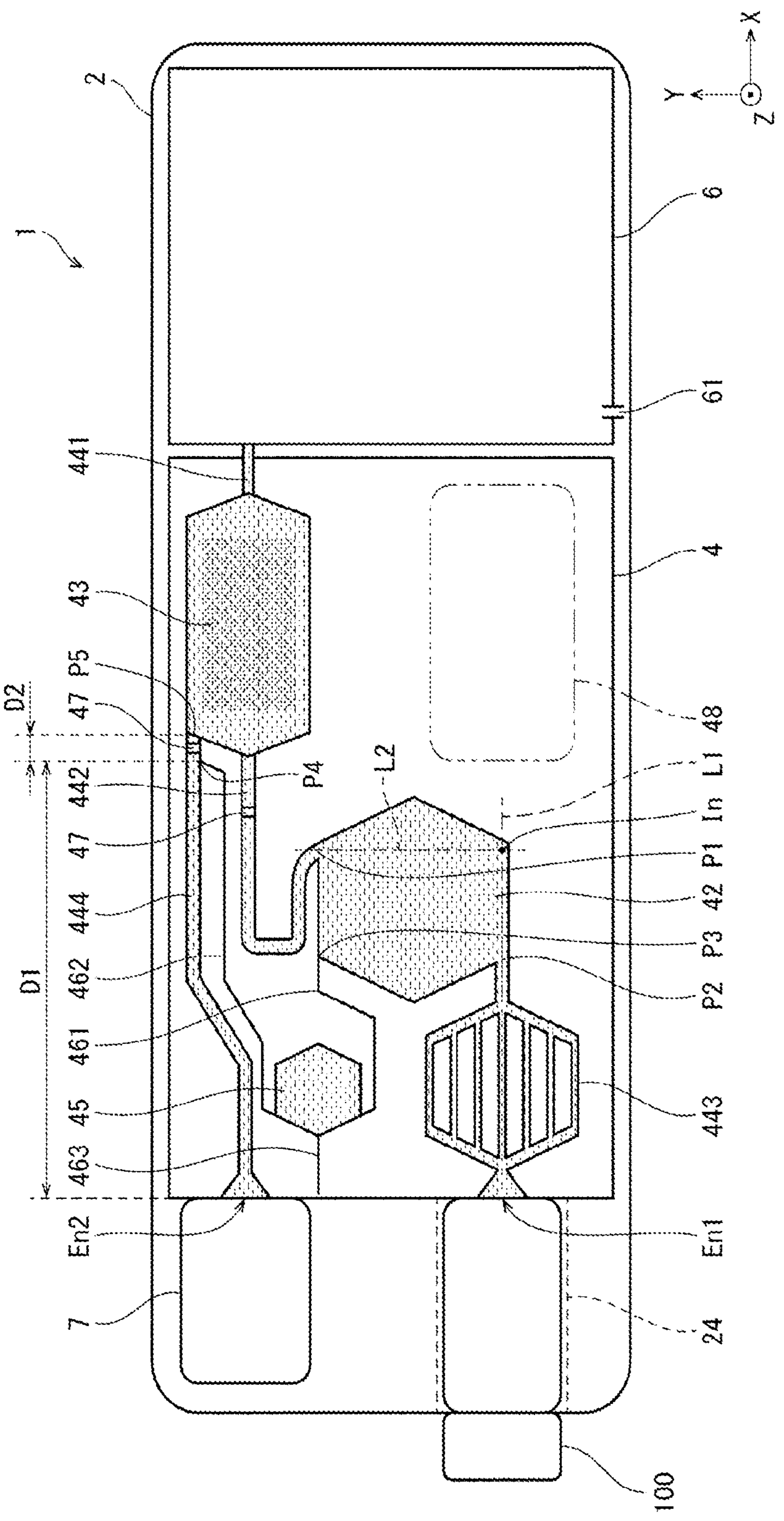
FIG. 1 illustrates a specific interior structure of an example of a flow channel device according to a first embodiment.

FIG. 1 illustrates an example of the specific interior structure of the interior of the flow channel device 1. As illustrated in FIG. 1, the microchannel substrate 4 may include a second storage part 42, the first storage part 43, and a third upper storage part 45. The microchannel substrate 4 may include a first flow channel 441, a second flow channel 442, a third flow channel 443, a fourth flow channel 444, a first gas discharge channel 461, a second gas discharge channel 462, and a third gas discharge channel 463.

In the following description, the vertically upper side in the state in which the flow channel device 1 is in use may simply be referred to as the vertically upper side. The vertically lower side in the state in which the flow channel device 1 is in use may simply be referred to as the vertically lower side.

The second storage part 42 may temporarily store liquid to be introduced into the first storage part 43. The liquid may be a mixture solution of the specimen solution and the reagent introduced through the third flow channel 443. In the second storage part 42, as will be described later, the mixture solution may be stirred while temporarily stored. The volume of the second storage part 42 may be greater than the volume of the first storage part 43.

The third flow channel 443 may be a channel that enables the mixture solution of the specimen solution introduced from the specimen container 100 and the reagent distributed inside the third flow channel 443 to pass to the second storage part 42. The third flow channel 443 may be connected to the insertion portion 24 and the second storage part 42. In the present embodiment, the third flow channel 443 is connected to a region on the vertically lower side of the insertion portion 24 and a region on the vertically upper side of the second storage part 42. The third flow channel 443 may include a mesh filter provided on an inlet En1 into which the specimen solution is introduced.

The reagent is dissolved in the specimen solution and guided with the specimen solution into the second storage part 42. In the present embodiment, the third flow channel 443 may include a plurality of branch flow channels, and the reagent may be distributed in the branch flow channels. This allows the specimen solution to efficiently contact the reagent. Alternatively, the third flow channel 443 may be a single flow channel.

The reagent dissolved in the specimen solution in the third flow channel 443 may be introduced into the second storage part 42 in a highly concentrated state. The specimen solution is introduced sequentially from the specimen container 100, and the reagent may be diluted in the specimen solution in the second storage part 42.

The second flow channel 442 may be a channel that enables the mixture solution to pass to the first storage part 43. The second flow channel 442 may be connected to the second storage part 42 and the first storage part 43. In the present embodiment, the second flow channel 442 is connected to the region on the vertically lower side of the second storage part 42 and the region on the vertically upper side of the first storage part 43.

Figure 6:
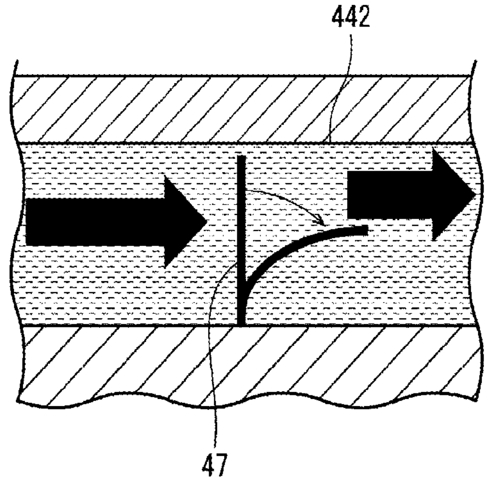
FIG. 6 schematically illustrates an example of a check valve.

A check valve 47 may be provided inside the second flow channel 442 (that is, between the second storage part 42 and the first storage part 43). FIG. 6 is a schematic view of an example of the check valve 47. As illustrated in FIG. 6, the check valve 47 may be a member protruding from the bottom surface of the second flow channel 442. The check valve 47 may bend in a direction of the flow of the mixture solution (the arrow direction in FIG. 6) when the mixture solution flows from the second storage part 42 to the first storage part 43. This means that, even with the check valve 47, the second flow channel 442 enables the mixture solution to pass to the first storage part 43. On the other hand, the amount of the mixture solution per unit time flowing back from the first storage part 43 to the second storage part 42 is smaller than the amount of the mixture solution per unit time flowing from the second storage part 42 to the first storage part 43. Accordingly, the amount of deflection of the check valve 47 during flow back is smaller than the amount of deflection of the check valve 47 when the mixture solution is flowing from the second storage part 42 to the first storage part 43. Thus, the check valve 47 reduces the likelihood of the mixture solution flowing back toward the second storage part 42.

The fourth flow channel 444 may be a channel that enables the oil introduced from the fourth storage part 7 to pass to the first storage part 43. The fourth flow channel 444 may be connected to the fourth storage part 7 and the first storage part 43. In the present embodiment, the fourth flow channel 444 is connected to a region on the vertically lower side of the fourth storage part 7 and a region on the vertically upper side of the first storage part 43. The check valve 47 may also be provided inside the fourth flow channel 444. This reduces the likelihood of the oil flowing back to the fourth storage part 7 side. The fourth flow channel 444 may include a mesh filter provided on an inlet En2 into which the oil is introduced.

The first flow channel 441 may be a channel through which the mixture solution stored in the first storage part 43 passes. The first flow channel 441 may also be a channel through which the oil introduced into the first storage part 43 passes. In the present embodiment, the first flow channel 441 is connected to the region on the vertically lower side of the first storage part 43 and the region on the vertically upper side of the third lower storage part 6, and the mixture solution and the oil are guided to the third lower storage part 6.

The first flow channel 441 may have a thickness smaller than the thickness of the second flow channel 442. The reasons for this will be discussed later. For example, the ratio of the thickness of the first flow channel 441 to the thickness of the second flow channel 442 may be less than or equal to 0.5. As used herein, the "thickness" may be a width in a direction substantially perpendicular to the direction in which the liquid or gas flows.

The first flow channel 441 may have a thickness smaller than the thickness of the fourth flow channel 444. The amount of oil introduced into the first storage part 43 may be smaller than the amount of the mixture solution introduced into the first storage part 43 as long as it is sufficient to introduce the mixture solution into each of the recessed portions 432 and to push the mixture solution over the bottom surface 431. With the thickness defined as described above, the size of the flow channel device 1 can be reduced.

The third upper storage part 45 can, when the mixture solution leaks out of the second storage part 42 through the first gas discharge channel 461, store the mixture solution (the mixture solution that is no longer needed in the second storage part 42). In addition, the third upper storage part 45 can, when the oil leaks out of the fourth flow channel 444 through the second gas discharge channel 462, store the oil (the oil that is no longer needed in the fourth flow channel 444). The third upper storage part 45 may be a portion of the third storage part described above, that is, a portion on the vertically upper side of the third storage part. The third upper storage part 45 may be disposed on the vertically upper side of the second storage part 42.

The first gas discharge channel 461 may be a gas discharge channel that discharges the gas inside the second storage part 42 to the outside of the second storage part 42. The first gas discharge channel 461 may be connected to the second storage part 42 and the third upper storage part 45. In the present embodiment, the first gas discharge channel 461 is connected to a region on the vertically upper side of the second storage part 42 and to the third upper storage part 45. By providing the first gas discharge channel 461, the gas inside the second storage part 42 can be discharged to the outside of the second storage part 42 when the mixture solution is introduced into the second storage part 42. When the third upper storage part 45 is disposed on the vertically upper side of the second storage part 42, the first gas discharge channel 461 can be connected to the third upper storage part 45 at a position on the vertically upper side of the second storage part 42. This allows the gas inside the second storage part 42 to be efficiently discharged when the mixture solution is introduced into the second storage part 42.

The thickness of the first gas discharge channel 461 may be smaller than the thickness of the second flow channel 442. The ratio of the thickness of the first gas discharge channel 461 to the thickness of the second flow channel 442 may be less than or equal to 0.05. This allows the mixture solution to flow preferentially into the second flow channel 442 when the mixture solution comes into contact with the first gas discharge channel 461.

The second gas discharge channel 462 may be a gas discharge channel that discharges gas inside the fourth flow channel 444 to the outside of the fourth flow channel 444. The second gas discharge channel 462 may be connected to the fourth flow channel 444 and the third upper storage part 45. In the present embodiment, the second gas discharge channel 462 is connected to the region on the vertically lower side of the fourth flow channel 444 and the third upper storage part 45. By providing the second gas discharge channel 462, the gas inside the fourth flow channel 444 can be discharged to the outside of the fourth flow channel 444 when the oil is introduced into the first storage part 43. In addition, when the third upper storage part 45 is disposed on the vertically upper side of the second storage part 42, the second gas discharge channel 462 can be connected to the third upper storage part 45 at a position on the vertically upper side of the second storage part 42. This allows the gas inside the fourth flow channel 444 to be discharged efficiently when the oil is introduced into the first storage part 43.

The thickness of the second gas discharge channel 462 may be smaller than the thickness of the fourth flow channel 444. The ratio of the thickness of the second gas discharge channel 462 to the thickness of the fourth flow channel 444 may be less than or equal to 0.05. This allows the oil to preferentially flow into the first storage part 43 when the oil comes into contact with the second gas discharge channel 462.

Assume that a portion connecting the fourth flow channel 444 and the second gas discharge channel 462 is a fourth connecting portion P4, and a portion connecting the first storage part 43 and the fourth flow channel 444 is a fifth connecting portion P5. At this time, a first distance D1 (distance) between the fourth connecting portion P4 and the inlet En2 of the fourth flow channel 444 may be longer than a second distance D2 (distance) between the fourth connecting portion P4 and the fifth connecting portion P5. This reduces the amount of gas that could be mixed into the first storage part 43.

The third gas discharge channel 463 may be a gas discharge channel that discharges gas inside the third upper storage part 45 to the outside of the flow channel device 1. The third gas discharge channel 463 may be connected to the third upper storage part 45 and the housing 2. This enables the gas inside the second storage part 42 or the fourth flow channel 444 to be discharged to the outside the flow channel device 1.

The microchannel substrate 4 may include a region where the above-mentioned components are not provided. Such a region may be a backup region 48 where the first flow channel 441 can be disposed if the first flow channel 441 is extended. The extended first flow channel 441 can increase the internal pressure of the first storage part 43 even when there is a small pressure drop in the first flow channel 441.

The third lower storage part 6 may include a ventilation portion 61. The ventilation portion 61 can reduce the increase of the internal pressure in the third lower storage part 6 when the specimen solution, the mixture solution, and the oil flow into the third lower storage part 6.

Channel Formation Method

Figure 7:
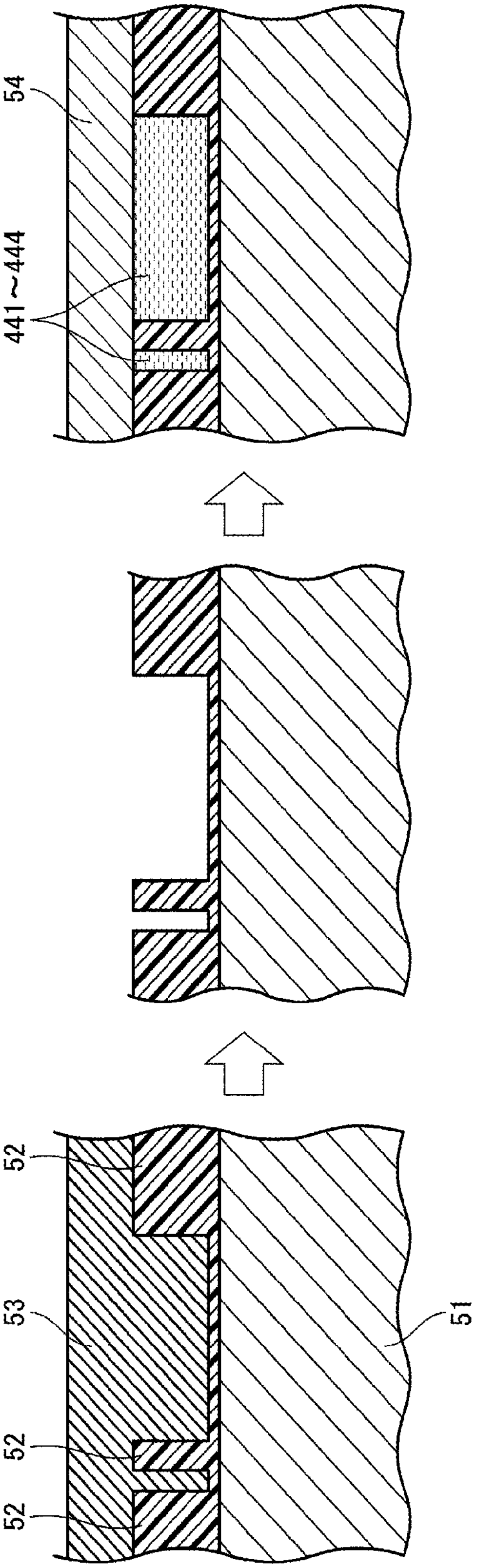
FIG. 7 schematically illustrates an example of a method for forming first to fourth flow channels.

FIG. 7 schematically illustrates an example of a method for forming the first to fourth flow channels 441 to 444. In addition to the flow channels, the same and/or similar method for forming the first to fourth flow channels 441 to 444 can be applied to form the second storage part 42, the first storage part 43, the third upper storage part 45, the check valve 47, and the first to third gas discharge channels 461 to 463.

For example, a molding 53 with the shapes of the first to fourth flow channels 441 to 444 patterned is placed on a support 51, and resin 52 is poured into the molding 53. Upon curing of the resin 52, the molding 53 is removed. After removing the molding 53, a lid 54 is formed on the cured resin 52 to form the first to fourth flow channels 441 to 444 on the support 51.

Mixing Liquid in Second Storage Part

Assume that a straight line that overlaps the direction of the mixture solution flowing from the third flow channel 443 into the second storage part 42 is a first straight line L1, and a straight line that overlaps the direction of the mixture solution flowing out of the second storage part 42 into the second flow channel 442 is a second straight line L2. The second and third flow channels 442 and 443 may be connected to the second storage part 42 so that the first and second straight lines L1 and L2 have an intersection In. Assume that the second storage part 42 is connected to the second flow channel 442 at a first connecting portion P1. The second flow channel 442 and the third flow channel 443 may be connected to the second storage part 42 so that the first straight line L1 passes through a point different from the first connecting portion P1.

This connection can generate turbulence in the flow of the mixture solution in the second storage part 42 due to different directions of flow of the mixture solution near the first connecting portion P1 and near a second connecting portion P2 (which will be described later). Accordingly, the mixture solution can be mixed efficiently, achieving a substantially uniform concentration of the mixture solution (distribution of specimen in the mixture solution). Thus, the mixture solution having the substantially uniform concentration can be guided to the first storage part 43.

Assume that a portion at which the second storage part 42 is connected to the third flow channel 443 is a second connecting portion P2, and a portion at which the second storage part 42 is connected to the first gas discharge channel 461 is a third connecting portion P3. A third distance (distance) between the first connecting portion P1 and the second connecting portion P2 may be longer than a fourth distance (distance) between the second connecting portion P2 and the third connecting portion P3.

In addition, the third distance may be longer than a fifth distance (distance) between the first connecting portion P1 and the third connecting portion P3.

Figure 11:
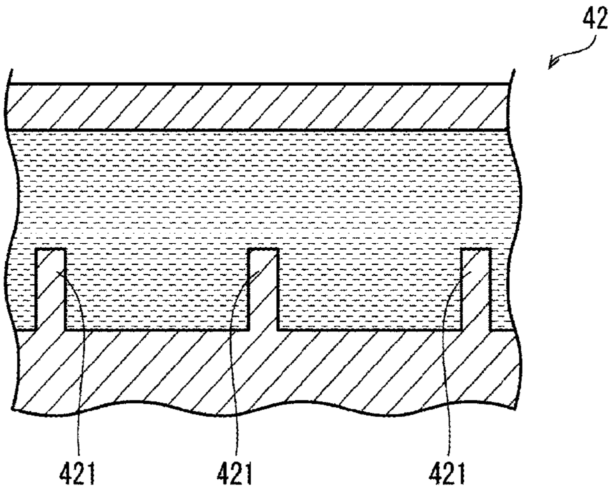
FIG. 11 is a side view schematically illustrating a portion of a second storage part.

FIG. 11 is a side view schematically illustrating a portion of the second storage part 42. As illustrated in FIG. 11, the second storage part 42 may include a plurality of internal protruding portions 421. The plurality of the protruding portions 421 interrupt the flow of the mixture solution in the second storage part 42, generating turbulence in the flow of the mixture solution in the second storage part 42.

Storage Principle of Second Storage Part Assume that the pressure loss of the mixture solution in the second flow channel 442 is defined as ΔPS-aq, the pressure loss of gas (air) in the first gas discharge channel 461 is defined as ΔPN-air, and the pressure loss of the mixture solution in the first gas discharge channel 461 is defined as ΔPN-aq.

When the mixture solution is introduced into the second storage part 42, ΔPS-aq>ΔPN-air is satisfied, because the viscosity of the mixture solution is greater than the viscosity of the gas. Accordingly, the mixture solution does not flow out of the second flow channel 442 from the second storage part 42, while the gas stored inside the second storage part 42 is discharged from the first gas discharge channel 461. This allows the mixture solution to be introduced into and stored in the second storage part 42 while maintaining the internal pressure of the second storage part 42 at a substantially constant level.

When the mixture solution accumulates in the second storage part 42 up to the first gas discharge channel 461, ΔPN-aq is generated. Since the thickness of the second flow channel 442 is greater than the thickness of the first gas discharge channel 461, ΔPS-aq<ΔPN-aq. Accordingly, the mixture solution flows into the second flow channel 442.

The pressure loss principle described above enables the mixture solution to be stored in the second storage part 42 until the mixture solution reaches the third connecting portion P3. As described above, the turbulence generated in the flow of the mixture solution in the second storage part 42 enables the mixture solution to be mixed efficiently in the second storage part 42 by temporarily storing the mixture solution in the second storage part 42. As a result, the concentration of the mixture solution can be made substantially uniform.

Accordingly, the mixture solution having a substantially uniform concentration can be introduced into the first storage part 43.

Since the mixture solution can be stored in the second storage part 42 until it reaches the third connecting portion P3, the amount of the mixture solution stored in the second storage part 42 is defined according to the position at which the first gas discharge channel 461 is connected to the second storage part 42 (the position of the third connecting portion P3). Connecting the first gas discharge channel 461 to the region on the vertically upper side of the second storage part 42 can increase the filling rate of the mixture solution in the second storage part 42. Since the retention time of the mixture solution in the second storage part 42 can be longer, the mixture solution can be efficiently mixed in the second storage part 42.

The position of the third connecting portion P3 is adjustable to regulate the amount of the mixture solution stored in the second storage part 42. For example, the position of the third connecting portion P3 needs to be adjusted so that the mixture solution can be stored in the second storage part 42 to the extent that the mixture solution is distributed throughout the interior of the first storage part 43 in single virus detection.

In addition, for example, when the volume of the second storage part 42 is equal to the volume of the first storage part 43, the first gas discharge channel 461 may be connected to the uppermost part of the second storage part 42 when the flow channel device 1 is in use.

Connection and Shape of Second Flow Channel

As described above, when the mixture solution reaches the third connecting portion P3 in the second storage part 42, the mixture solution flows into the second flow channel 442. As the internal pressure in the second storage part 42 drops at the moment of flow into the second flow channel 442, the water level is temporarily lowered in the second storage part 42, and the gas can flow back into the second storage part 42 through the first gas discharge channel 461.

When the second flow channel 442 is connected to the region on the vertically upper side of the second storage part 42, the backflow of gas could flow into the second flow channel 442. When the gas flows into the first storage part 43, virus detection accuracy may decrease. That is, the performance of the first storage part 43 may be degraded.

As illustrated in FIG. 1, the second flow channel 442 may be in an inverted U-shape when the flow channel device 1 is in use. The second flow channel 442 may be connected to the region on the vertically lower side of the second storage part 42. In the present embodiment, the second flow channel 442 extends vertically upward from the first connecting portion P1 in the region on the vertically lower side of the second storage part 42 to the vicinity of the position of the third connecting portion P3. The second flow channel 442 curves at the third connecting portion P3, extends vertically downward, and is connected to the first storage part 43.

Issues and Effects of First Storage Part

When the flow channel device 1 is in use, the second flow channel 442 is disposed on the vertically upper side of the first flow channel 441. When the thickness of the first flow channel 441 is greater than or equal to the thickness of the second flow channel 442, the amount of liquid flowing out of the first storage part 43 can be greater than or equal to the amount of liquid flowing into the interior of the first storage part 43. In this case, the liquid could flow out of the first storage part 43 before it is distributed throughout the interior of the first storage part 43.

By reducing the thickness of the first flow channel 441 to be smaller than the thickness of the second flow channel 442, the amount of liquid flowing out of the first storage part 43 can be made smaller than the amount of liquid flowing into the interior of the first storage part 43. This increases the internal pressure in the first storage part 43 and increases the possibility of distributing the liquid throughout the entire first storage part 43.

If there is a region where the liquid is not distributed in the first storage part 43, the substance contained in the liquid (for example, specimen) cannot be detected there. This could reduce the accuracy of measurement of the substance. Increasing the possibility of distributing the liquid throughout the entire first storage part 43 as described above reduces the possibility of generating such a region as mentioned above, so that the accuracy of the measurement of the substance can be improved. This effect is obtained with or without the presence of the plurality of the recessed portions 432.

In the present embodiment, the first storage part 43 includes the plurality of the internal recessed portions 432. As described above, the flow channel device 1 can increase the internal pressure of the first storage part 43, thus introducing the mixture solution into each recessed portion 432 with high accuracy.

Also, as described above, the second storage part 42 can achieve a substantially uniform concentration of the mixture solution. This increases the possibility of distributing the mixture solution having the substantially uniform concentration throughout the entire first storage part 43. Accordingly, it is possible to detect viruses with greater accuracy.

Second Embodiment

Another embodiment of the present disclosure will be described below. For convenience of description, a member having the same function as that of a member described in the embodiments described above is denoted by the same reference sign, and description thereof will not be repeated. In other embodiments, members having the same functions as those already described are denoted by the same reference signs, and the description thereof will not be repeated.

Figure 8:
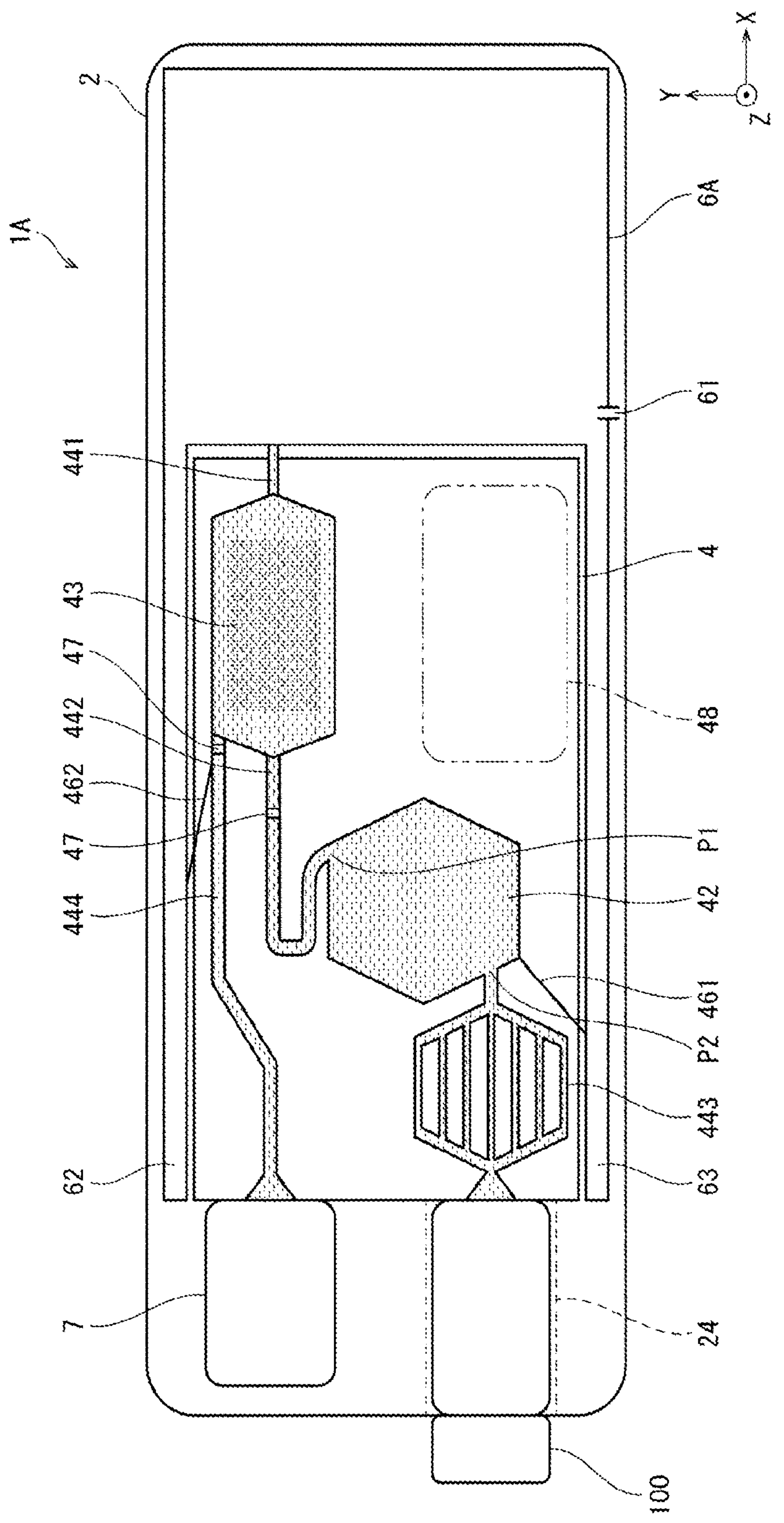
FIG. 8 illustrates a specific interior structure of an example of a flow channel device according to a second embodiment.

FIG. 8 illustrates a specific interior structure of an example of a flow channel device 1A. As illustrated in FIG. 8, the flow channel device 1A differs from the flow channel device 1 in that a third storage part 6A is provided instead of the third lower storage part 6 and the third upper storage part 45. The flow channel device 1A also differs from the flow channel device 1 in that the third gas discharge channel 463 is eliminated.

As illustrated in FIG. 8, the third storage part 6A may include, as part thereof, extension portions 62 and 63 extending vertically upward on both sides of the microchannel substrate 4. Since the first gas discharge channel 461 is connected to the extension portion 63, the mixture solution can be stored in the third storage part 6A, even when the mixture solution inside the second storage part 42 leaks out from the first gas discharge channel 461. In addition, since the second gas discharge channel 462 is connected to the extension portion 62, the oil that flows in the fourth flow channel 444 can be stored in the third storage part 6A, even when the oil leaks out from the second gas discharge channel 462.

The extension portion 63 may be disposed on the vertically upper side of the second storage part 42 when the flow channel device 1 is in use. In this case, the first gas discharge channel 461 can be connected to the extension portion 63 at a position on the vertically upper side of the second storage part 42. This allows the gas inside the second storage part 42 to be efficiently discharged.

Third Embodiment

Figure 9:
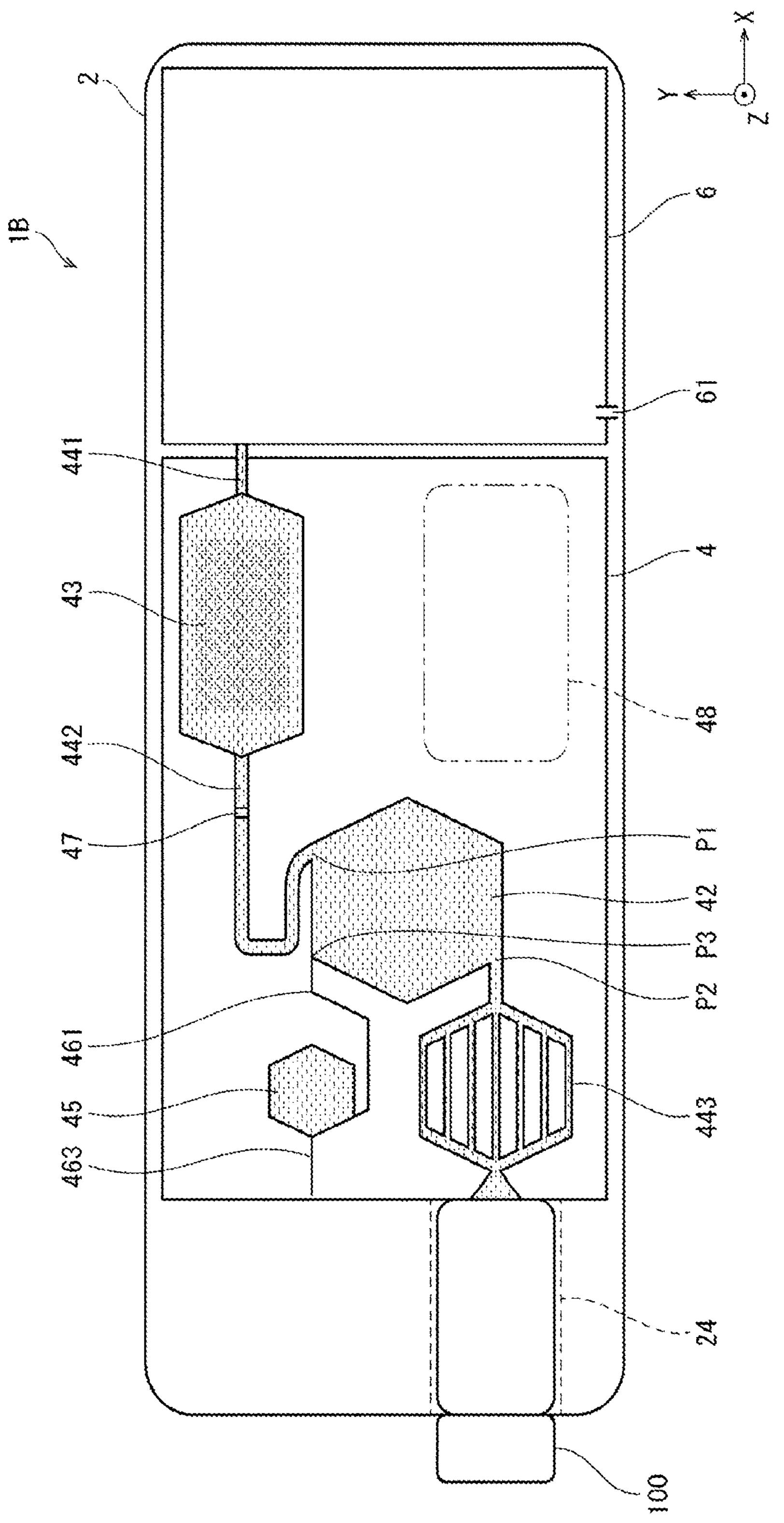
FIG. 9 illustrates a specific interior structure of an example of a flow channel device according to a third embodiment.

FIG. 9 illustrates a specific interior structure of an example of a flow channel device 1B. As illustrated in FIG. 9, the flow channel device 1B differs from the flow channel device 1 in that the fourth storage part 7, the fourth flow channel 444, and the second gas discharge channel 462 are omitted.

When oil is used in the flow channel device 1B, after introducing the specimen solution from the specimen container 100, the specimen container 100 may be removed from the insertion portion 24 and the container containing the oil may be inserted into the insertion portion 24. Thus, in the flow channel device 1B, the second and third flow channels 442 and 443 may also function as channels through which oil passes.

Fourth Embodiment

Figure 10:
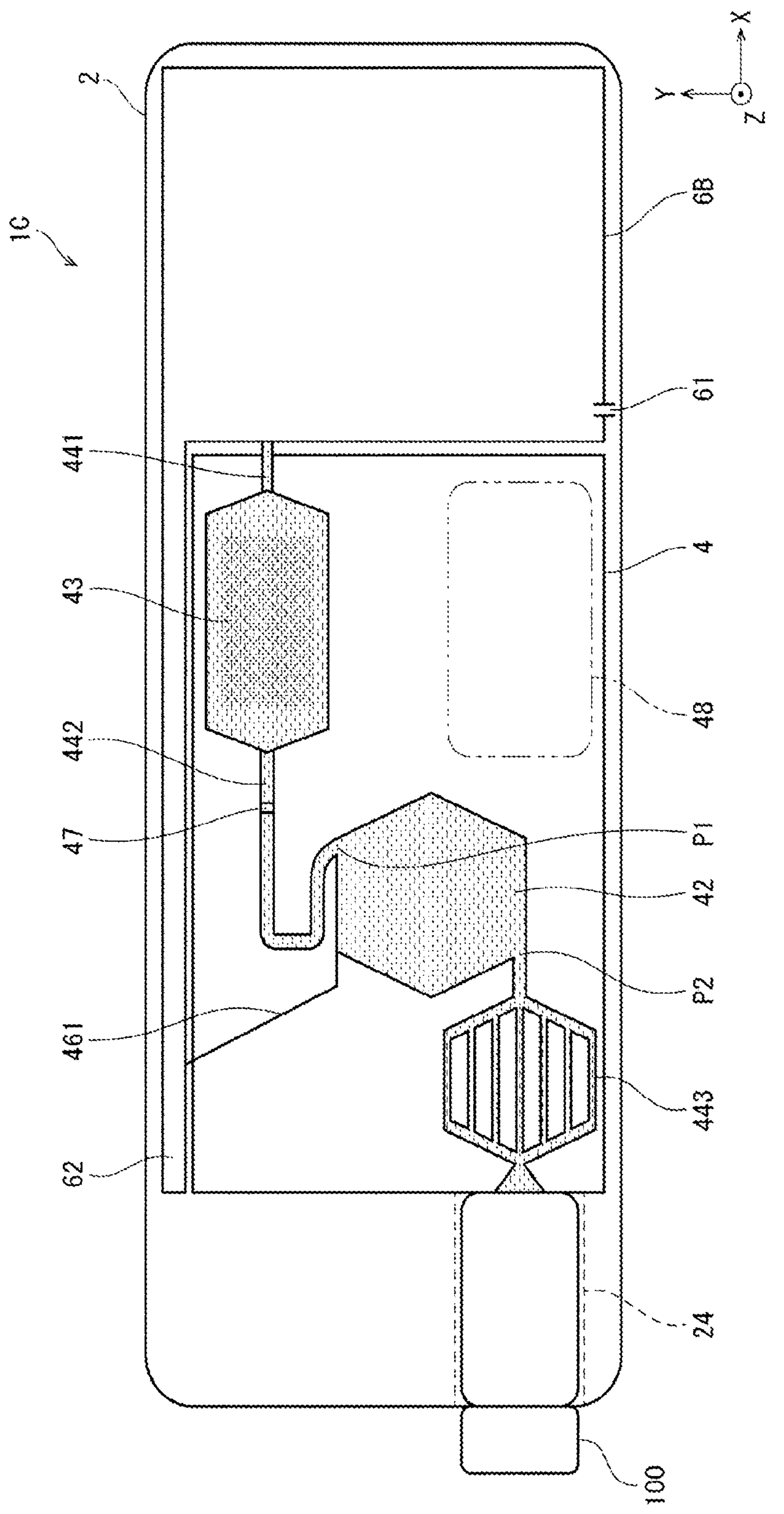
FIG. 10 illustrates a specific interior structure of an example of a flow channel device according to a fourth embodiment.

FIG. 10 illustrates a specific interior structure of an example of a flow channel device 1C. As illustrated in FIG. 10, the flow channel device 1C differs from the flow channel device 1B in that a third storage part 6B is provided instead of the third lower storage part 6 and the third upper storage part 45. The flow channel device 1C also differs from the flow channel device 1B in that the third gas discharge channel 463 is omitted.

As illustrated in FIG. 10, the third storage part 6B may include, as a part thereof, the extension portion 62 extending vertically upward on one side of the microchannel substrate 4. Since the first gas discharge channel 461 is connected to the extension portion 62, the mixture solution can be stored in the third storage part 6B, even when the mixture solution inside the second storage part 42 leaks out from the first gas discharge channel 461.

The extension portion 62 may be disposed on the vertically upper side of the second storage part 42 when the flow channel device 1 is in use. In this case, the first gas discharge channel 461 can be connected to the extension portion 62 at a position on the vertically upper side of the second storage part 42. This allows the gas inside the second storage part 42 to be efficiently discharged.

Supplementary Note

In the present disclosure, the invention has been described above based on the various drawings and examples. However, the invention according to the present disclosure is not limited to each embodiment described above. That is, the embodiments of the invention according to the present disclosure can be modified in various ways within the scope illustrated in the present disclosure, and embodiments obtained by appropriately combining the technical means disclosed in different embodiments are also included in the technical scope of the invention according to the present disclosure. In other words, note that a person skilled in the art can easily make various variations or modifications based on the present disclosure. Note that these variations or modifications are included within the scope of the present disclosure.

For example, in the flow channel devices 1 and 1A to 1C (see FIGS. 1 and 8 to 10) of the embodiments 1 to 4, respectively, the specimen solution including the specimen and the buffer solution is introduced into the flow channel device 1 and 1A to 1C, but the specimen alone may be introduced into the flow channel devices 1 and 1A to 1C. In that case, in the flow channel devices 1 and 1A to 1C, the mixture solution of the specimen and the reagent is fed to the first storage part 43.

The reagent may be disposed inside the second storage part 42. In that case, the specimen solution (or specimen alone) may be introduced into the second storage part 42, and the specimen solution (or specimen only) and the reagent may be mixed in the second storage part 42.

The flow channel devices 1 and 1A to 1C may be used for the detection of various substances, not only for the detection of viruses in specimens. The flow channel devices 1 and 1A to 1C may be used for quantitative analysis of various substances.

The first storage part 43 need not include the plurality of the internal recessed portions 432, and the bottom surface 431 may be a smooth surface. The smooth surface indicates a surface that does not have any visible level of unevenness, and is not required to be strictly smooth. In that case, the flow channel devices 1 and 1A to 1C can also be applied to digital ELIZA, for example.

Thus, even when the first storage part 43 does not include the plurality of the internal recessed portions 432, the likelihood of distributing the liquid throughout the first storage part 43 increases by making the thickness of the first flow channel 441 smaller than the thickness of the second flow channel 442. With this structure, it is also possible to improve the measurement accuracy of substances contained in liquids, as described above.

Furthermore, the flow channel device 1 need not include the third upper storage part and the third gas discharge channel 463. In that case, the first gas discharge channel 461 and the second gas discharge channel 462 may be directly connected to the housing 2. Similarly, in the flow channel devices 1A to 1C, the first gas discharge channel 461 and/or the second gas discharge channel 462 may be connected directly to the housing 2.

In the flow channel device 1A, the third storage part 6A may include only one of the extension portions 62 and 63. In that case, the third upper storage part 45 may be provided as a part of the third storage part 6A. The second gas discharge channel 462 may be connected to the third upper storage part 45 when the extension portion 62 is eliminated. When the extension portion 63 is eliminated, the first gas discharge channel 461 may be connected to the third upper storage part 45.

In the flow channel device 1C of the fourth embodiment, the third storage part 6B may include the extension portion 63 instead of the extension portion 62 (see FIG. 8). In that case, the first gas discharge channel 461 may be connected to the extension portion 63 as illustrated in FIG. 8.

The flow channel devices 1 and 1A to 1C may not include the pressure switch 8. In that case, the user may press the specimen container 100 with a finger, for example.

REFERENCE SIGNS

1, 1A to 1C Flow channel device
6 Third lower storage part (Third storage part)
6A, 6B Third storage part
42 Second storage part
43 First storage part
45 Third upper storage part (Third storage part)
47 Check valve
432 Recessed portion
441 First flow channel
442 Second flow channel
443 Third flow channel
444 Fourth flow channel
461 First gas discharge channel
462 Second gas discharge channel
D1 First distance (Distance)
D2 Second distance (Distance)
En2 Inlet
In Intersection
L1 First straight line
L2 Second straight line
P1 First connecting portion
P2 Second connecting portion
P3 Third connecting portion
P4 Fourth connecting portion (Connecting portion of fourth flow channel and second gas discharge channel)
P5 Fifth connecting portion (Connecting portion of first storage part and fourth flow channel)

The invention claimed is:

1. A flow channel device comprising:
a first storage part that stores liquid;
a second storage part that stores liquid to be introduced into the first storage part;
a first flow channel through which the liquid in the first storage part passes;

a second flow channel which is connected to the second storage part and the first storage part and through which the liquid passes from the second storage part to the first storage part; and a first gas discharge channel that discharges a gas inside the second storage part out of the second storage part, wherein a thickness of the first flow channel is smaller than a thickness of the second flow channel, a thickness of the first gas discharge channel is smaller than a thickness of the second flow channel; and a third flow channel that enables the liquid to pass to the second storage part, wherein the second storage part is connected to the second flow channel, and an intersection is formed between a first straight line that overlaps a flow direction of the liquid flowing into the second storage part from the third flow channel and a second straight line that overlaps a flow direction of the liquid flowing out of the second storage part to the second flow channel.

2. The flow channel device according to claim 1, further comprising:

a third storage part that stores unnecessary liquid, wherein the first gas discharge channel is connected to the third storage part.

3. The flow channel device according to claim 2, wherein a portion of the third storage part is disposed on a vertically upper side of the second storage part when the flow channel device is in use.

4. The flow channel device according to claim 1, further comprising:

a fourth flow channel which is different from the second flow channel, the fourth flow channel enabling the liquid to pass to the first storage part, wherein the thickness of the first flow channel is smaller than a thickness of the fourth flow channel.

5. The flow channel device according to claim 1, further comprising:

a check valve provided between the first storage part and the second storage part.

6. The flow channel device according to claim 1, wherein the first storage part includes a plurality of internal fine recessed portions.

7. The flow channel device according to claim 6, wherein a size of each of the plurality of internal fine recessed portions is defined as large enough to introduce a single virus particle.

8. The flow channel device according to claim 1, wherein the second storage part is connected to the second flow channel at a first connecting portion, and the first straight line passes through a point different from the first connecting portion.

9. The flow channel device according to claim 1, wherein the first gas discharge channel is connected to a region on a vertically upper side of the second storage part when the flow channel device is in use.

10. The flow channel device according to claim 1, wherein the second storage part is connected to the second flow channel at a first connecting portion, the second storage part is connected to the third flow channel at a second connecting portion, and the second storage part is connected to the first gas discharge channel at a third connecting portion, and a distance between the first connecting portion and the second connecting portion is longer than a distance between the second connecting portion and the third connecting portion.

11. The flow channel device according to claim 10, wherein the distance between the first connecting portion and the second connecting portion is longer than a distance between the first connecting portion and the third connecting portion.

12. A flow channel device comprising:

a first storage part that stores liquid;

a second storage part that stores liquid to be introduced into the first storage part;

a first flow channel through which the liquid in the first storage part passes;

a second flow channel which is connected to the second storage part and the first storage part and through which the liquid passes from the second storage part to the first storage part;

a third flow channel that passes liquid to the second storage part;

a fourth flow channel which is different from the second flow channel, the fourth flow channel enabling the liquid to pass to the first storage part;

a first gas discharge channel that discharges a gas inside the second storage part out of the second storage part; and a second gas discharge channel that discharges gas in the fourth flow channel out of the fourth flow channel, wherein a thickness of the first flow channel is smaller than a thickness of the second flow channel, a thickness of the first gas discharge channel is smaller than a thickness of the second flow channel, the thickness of the first flow channel is smaller than a thickness of the fourth flow channel, a distance between an inlet of the fourth flow channel and a connecting portion of the fourth flow channel and the second gas discharge channel is longer than a distance between the connecting portion of the fourth flow channel and the second gas discharge channel and a connecting portion between the first storage part and the fourth flow channel.

13. The flow channel device according to claim 12, further comprising:

a third storage part that stores unnecessary liquid, wherein the second gas discharge channel is connected to the third storage part.

* * * * *